US008774110B2

(12) United States Patent
Oyman

(10) Patent No.: US 8,774,110 B2
(45) Date of Patent: Jul. 8, 2014

(54) LINK ADAPTATION AND ANTENNA SELECTION IN COOPERATIVE MULTIPLE ACCESS SYSTEMS

(75) Inventor: Ozgur Oyman, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 148 days.

(21) Appl. No.: 13/182,347

(22) Filed: Jul. 13, 2011

(65) Prior Publication Data

US 2011/0268041 A1 Nov. 3, 2011

Related U.S. Application Data

(62) Division of application No. 11/681,696, filed on Mar. 2, 2007.

(51) Int. Cl.
*H04W 4/00* (2009.01)

(52) U.S. Cl.
USPC .............. 370/329; 455/115.1; 455/562.1

(58) Field of Classification Search
USPC ........................................................ 370/329
See application file for complete search history.

(56) References Cited

U.S. PATENT DOCUMENTS

| 5,867,478 | A * | 2/1999 | Baum et al. ............... 370/203 |
| 6,298,092 | B1 * | 10/2001 | Heath et al. ................ 375/267 |
| 6,611,231 | B2 * | 8/2003 | Crilly et al. ................ 342/378 |
| 6,754,475 | B1 * | 6/2004 | Harrison et al. ........... 455/115.1 |
| 7,072,315 | B1 * | 7/2006 | Liu et al. .................... 370/329 |
| 7,623,589 | B2 | 11/2009 | Oyman et al. |
| 7,796,702 | B2 * | 9/2010 | Li ............................... 375/267 |
| 2003/0185309 | A1 * | 10/2003 | Pautler et al. ............... 375/257 |
| 2004/0114618 | A1 * | 6/2004 | Tong et al. .................. 370/431 |
| 2005/0064872 | A1 * | 3/2005 | Osseiran et al. ............ 455/452.1 |
| 2006/0121946 | A1 * | 6/2006 | Walton et al. .............. 455/561 |
| 2007/0105508 | A1 | 5/2007 | Tong et al. |
| 2007/0183529 | A1 * | 8/2007 | Tujkovic et al. ............ 375/267 |
| 2008/0014884 | A1 | 1/2008 | Oyman et al. |
| 2008/0155148 | A1 | 6/2008 | Oyman |
| 2011/0003606 | A1 * | 1/2011 | Forenza et al. ............ 455/501 |

OTHER PUBLICATIONS

Paulraj et. al. "Introduction to Space-Time Wireless Communications", Cambridge University Press, Cambridge, U.K., 1st edition, 2003.
Sendonaris et al. "Increasing uplink capacity via user cooperation diversity", in Proc. IEEE International Symposium on Information Theory, Cambridge, MA, Aug. 1998, p. 156.
Proakis et al. "Communication Systems Engineering" Prentice Hall, U.S.A., 1994.
Heath et al. "Switching between diversity and multiplexing in MIMO Systems", IEEE Transactions on Communications, vol. 53, No. 6, pp. 962-968, Jun. 2006.
Heaht et al. "Antenna Selection for Spatial Multiplexing Systems with Linear Receivers", IEEE Communications Letters, vol. 5, No. 4, pp. 142-144, Apr. 2001.
Gore et al. "MIMO Antenna Subset Selection with Space-Time Coding", IEEE Transactions on Signal Processing, vol. 50, No. 10, pp. 2580-2588, Oct. 2002.

* cited by examiner

*Primary Examiner* — Michael J Moore, Jr.
(74) *Attorney, Agent, or Firm* — Schwabe, Williamson & Wyatt, P.C.

(57) ABSTRACT

Embodiments of the present invention provide techniques for applying link adaptation and antenna selection in cooperative multiple access systems where multiple user devices act cooperatively to communicate with a network access station through a MIMO channel.

17 Claims, 5 Drawing Sheets

LINK ADAPTATION AND ANTENNA SELECTION IN COOPERATIVE MULTIPLE ACCESS SYSTEMS

RELATED APPLICATIONS

This application is a divisional of U.S. patent application Ser. No. 11/681,696, entitled "LINK ADAPTATION AND ANTENNA SELECTION IN COOPERATIVE MULTIPLE ACCESS SYSTEMS," filed Mar. 2, 2007, the specification of which is hereby incorporated by reference in its entirety.

TECHNICAL FIELD

Embodiments of the present invention relate to the field of wireless communications, and, more specifically, to techniques for improving multiple access in a wireless system.

BACKGROUND

Wireless communication systems are experiencing an explosive growth in popularity. This increase in popularity has fueled a demand for wireless networks capable of providing high capacity, high quality, and power efficient voice and data communication. One such technology is multiple input, multiple output or MIMO. In a MIMO system, multiple antennas are utilized at each end of the point-to-point wireless link. This multiple antenna infrastructure allows known practical techniques to be utilized for improving spectral efficiency, link reliability, and power efficiency. This infrastructure, however, is also a major limiting factor in MIMO's widespread acceptance and deployment. While MIMO systems are able to provide higher throughput and reliability than other systems, their need for multiple antennas, and consequently, complex and costly RF chains, minimizes their suitability for certain applications.

In a recent patent application, cooperative communication techniques were disclosed which allow the advantages of MIMO to be achieved within systems using single antenna devices. The term cooperative communication refers to scenarios in which distributed radios interact jointly to transmit information in wireless environments. In effect, multiple single antenna devices cooperate with one another to appear as a single multiple antenna device. This allows the extraction of MIMO benefits in a distributed fashion. Cooperative communications or cooperative multiple access systems, however, do not allow the application of the known practical techniques currently used in MIMO systems to achieve spectral efficiency, link reliability, and power efficiency. Therefore, similar techniques to those used in MIMO systems, namely antenna selection and link adaptation, are needed for cooperative communication or cooperative multiple access systems.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention relate to techniques and apparatuses for implementing antenna selection and link adaptive space-time modulation algorithms in cooperative multi-access networks. In this manner, spectral efficiency, link reliability, and power efficiency may be obtained for systems wherein devices cooperate with one another in order to appear as a single multiple antenna device. The inventive techniques may be implemented by both single antenna and multiple antenna devices. In addition, the inventive techniques may be used within wireless local area networks (WLANs), wireless wide area networks (WWANs), wireless municipal area networks (WMANs), local multipoint distribution service (MMDS) systems, wireless cellular telephone networks, terrestrial wireless communication networks, satellite communication networks, and/or other types of wireless systems and networks.

Figure 1:
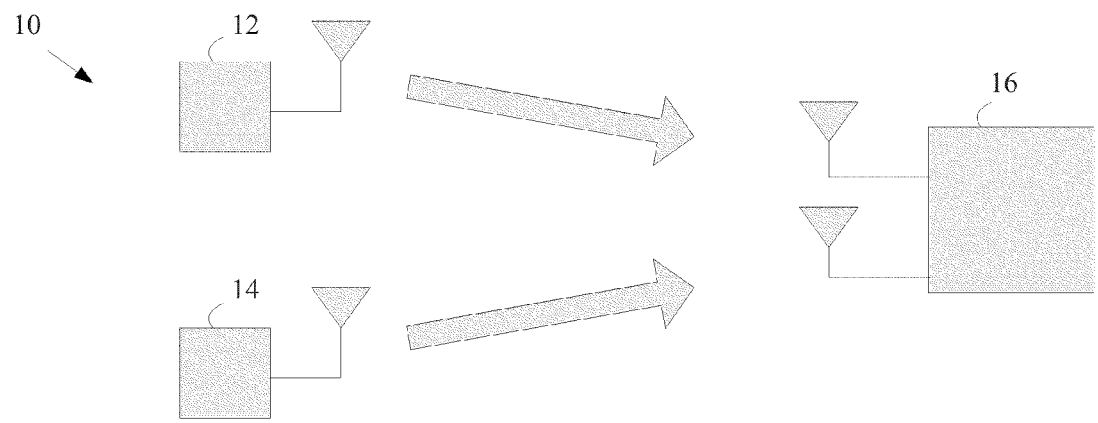
FIG. 1 is a block diagram illustrating a multi-user wireless network arrangement.

FIG. 1 is a block diagram illustrating a multi-user wireless network arrangement 10. As shown, first and second wireless user devices 12, 14 are each communicating with a network access station 16 in a multiple access relationship. The network access station may be either an access point, base station, or other device capable of relaying information to and from wireless devices and wired devices. The network access station 16 has finite communication resources available to it for use in servicing users and must allocate these resources amongst the current users. Resources may be allocated in a variety of different ways in a multiple access system. Some techniques for allocating resources include time division multiple access (TDMA) where one or more time slots are allocated to each active user, frequency division multiple access (FDMA) where one or more frequency channels are allocated to each user, code division multiple access (CDMA) where one or more spread spectrum codes may be allocated to each user, orthogonal frequency division multiple access (OFDMA) where a subgroup of subcarriers may be allocated to each user, spatial division multiple access (SDMA) where a common resource may be allocated to two different users concurrently as long as spatially separated antenna beams are used for the two users, and carrier sense multiple access with collision avoidance (CSMA-CA) where users first check to see if a medium is currently busy, transmit if it is not busy, and re-transmit if a collision occurs. Combinations of the above techniques may also be used. All of these techniques require the different users to "compete" for available resources.

In contrast, embodiments of the present invention relate to techniques applicable to cooperative multiple access systems. Cooperative multiple access allows multiple users to form transmit clusters that communicate as a single entity with a remote destination device or network access station (e.g., a base station, an access point, etc.). By cooperating with one another, the devices in the cluster are no longer in competition with each other for communication resources. Instead, the cooperating devices are assigned a single resource allocation that they may use cooperatively as if they were a single device. Even if the cooperating devices are single antenna devices, the cooperative arrangement, in addition to the techniques described below, allows the devices to achieve many of the benefits of MIMO based wireless operation (e.g., spatial multiplexing gain, diversity gain, array gain, etc.). The cooperating devices within a cluster may include all single antenna devices, all multi-antenna devices, or a combination of single and multi-antenna devices.

Figure 2:
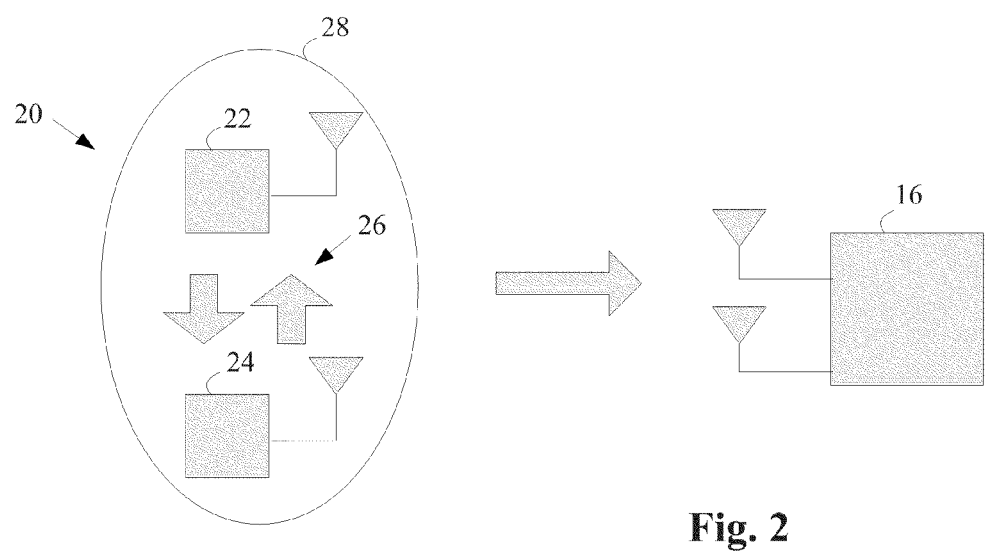
FIG. 2 is a block diagram illustrating an example cooperative multiple access arrangement in accordance with various embodiments of the present invention.

FIG. 2 is a block diagram illustrating an example cooperative multiple access arrangement 20 in accordance with an embodiment of the present invention. As shown, first and second wireless user devices 22, 24 have affiliated with one another as a transmit cluster 28 to communicate with a network access station 16. The cooperating devices 22, 24 may communicate with one another via intra-cluster wireless links 26. The cluster 28 may then transmit data to the network access station 16 as a single MIMO type unit, via a MIMO channel. The cluster 28 may utilize a common time/frequency resource allocated by the network access station 16 (resource allocation techniques such as, for example, OFDMA, OFDM-TDMA, and/or others may be used). After reception, the network access station 16 may demodulate and decode the data from the cluster 28 and separate out the data associated with each of the cooperating devices 22, 24.

In at least one embodiment, the receiver within the network access station 16 uses a MIMO receiver design. The network access station 16 may be able to support other non-cooperating wireless devices and/or other clusters at the same time that it is supporting the cooperative cluster 28. Further, any type of wireless device may be formed into a cluster including, for example, computers having wireless capability, personal digital assistants (PDAs) having wireless capability, cellular telephones and other handheld wireless communicators, and/or others. In addition, in at least one embodiment, a single cooperative cluster may include different types of wireless user devices. For example, a cluster may include a cellular telephone and a PDA that cooperate to transmit data to a network access station. Each wireless user device 22, 24 in the cluster 28 includes at least one corresponding antenna. Any type of antenna(s) may be used including, for example, a dipole, a patch, a helical antenna, an omni-directional antenna, and/or others.

Before a cluster 28 is able to communicate with a network access station 16, the cluster must be formed. As described previously, the devices within a cooperative cluster will communicate with one another using intra-cluster wireless links. These intra-cluster links should be high quality links (e.g., high signal to noise ratios (SNRs), etc.) that are capable of relatively high data rates. When high quality links exist between the cooperating users, the users are able to exchange packets with little cost in terms of power and bandwidth. Therefore, in at least one embodiment, only wireless user devices that are capable of supporting high quality links with one another will be allowed to form a cluster. For example, a user device may only be allowed to join a particular cluster if a channel quality parameter associated with the device satisfies a predetermined condition (e.g., a channel coefficient for a channel between the device and the other devices in the cluster is greater than a threshold value). In one possible approach, a user device may be designated as a master for a cluster to control the formation of the group. This may be, for example, a first device that indicates a desire to form a cluster. The master device may then allow other devices to join the cluster if they qualify. Measurements may be made of a channel quality of each candidate device with respect to each other device within the cluster. In some embodiments, there may be a maximum number of devices that will be permitted to join a cluster. Other techniques for establishing the cluster may alternatively be used.

The devices within a cluster will often be located much closer to one another than to the network access station. While the intra-cluster wireless links are high quality links, the channel between the cluster and the network access station 16 may suffer from effects such as path loss, shadowing, and multi-path fading. It is assumed that quasi-static channel conditions exist for all devices within the network arrangement. That is, the channel coherence time for all of the links is much larger than the frame duration and the channel coherence bandwidth is comparable in magnitude to the transmit signal bandwidth. It is also assumed that the channel is unknown at the transmitters but known at the network access station 16. In one embodiment, the network access station or receiver may then be able to transmit, over a low bandwidth feedback link, transmission instructions or alternatively channel information which allows the users to adapt their uplink transmission strategy and optimize the link quality.

Two practical techniques for optimizing link quality (e.g. throughput and reliability) in MIMO based systems are antenna selection and link adaptation. Antenna selection refers to the ability to transmit and receive information over the most efficient antennas. While link adaptation refers to the ability of the wireless device to switch between modulation schemes depending on the state of the channel. In various embodiments, the modulation schemes may be cooperative diversity, cooperative multiplexing, a hybrid cooperative mode, or a non-cooperative multi-access mode.

Figure 3:
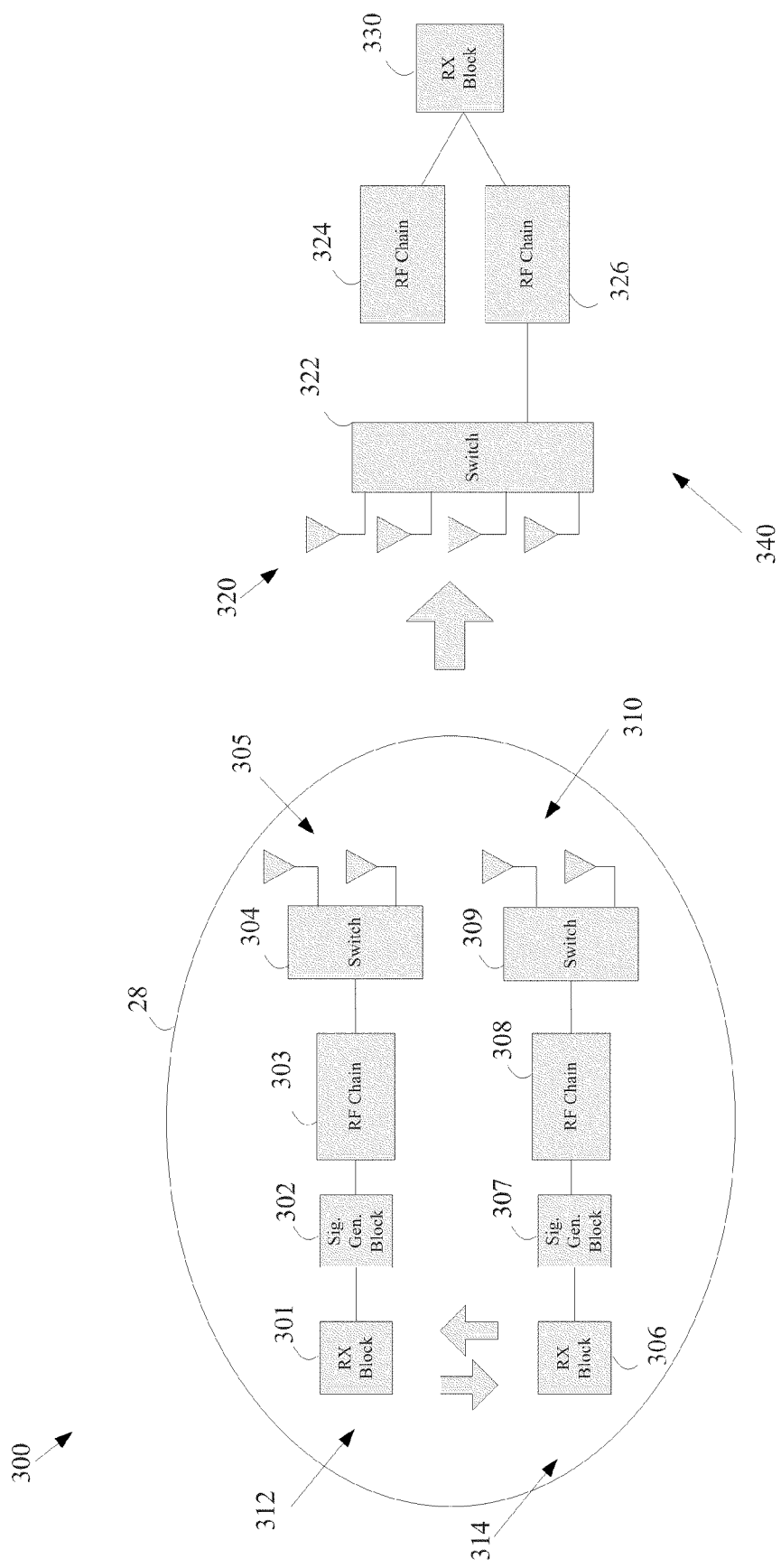
FIG. 3 is a block diagram illustrating an example cooperative multiple access wireless network arrangement capable of performing antenna selection in accordance with various embodiments of the present invention.

Referring to FIG. 3 a block diagram illustrating an example cooperative multiple access wireless network arrangement wherein the wireless devices and network access stations are capable of antenna selection is shown. The arrangement includes two wireless user devices 312, 314 each including: a receive block 301, 306, a signal generation block 302, 307, an RF chain 303, 308, a switch 304, 309, and a transmitting antenna array including two antennas 305, 310. The transmitting antenna array of the wireless user device may include one or more antennas, and may be coupled to one or more RF chains. The arrangement also includes a network access station 340 including: a receive block 330, two RF chains 324, 326, a switch 322, and a receiving antenna array including four antennas 320. The receiving antenna array may include two or more antennas, and may be coupled to one or more RF chains.

In one embodiment, each wireless user device and network access station comprises a reduced number of RF chains in relation to the number of antennas in their respective transmitting and receiving antenna arrays. That is, the number of RF chains is less than or equal to the number of antennas in the antenna array. For example, as shown in FIG. 3, each user device 312, 314 has a transmitting antenna array of two antennas 305, 310, and employs only one RF chain 303, 308, respectively. Similarly, the network access station has a receiving antenna array 320 comprising four antennas, and employs only two RF chains 324, 326. Given that a single RF chain may be utilized by only a single antenna at any given time, an antenna selection technique may be used to optimize the transmitting and receiving antenna arrays. Namely, the network access station 340, with knowledge of the number of antennas and RF chains of each wireless device, may determine the optimal transmitting antenna array subset for each wireless user device using antenna selection algorithms.

Antenna selection algorithms for MIMO networks are known in the art. These algorithms, however, are not applicable in cooperative multiple access systems. The known algorithms are applied in situations where a single device has multiple antennas. Stated another way, known methods of selecting antenna array subsets focus on selecting the subset from one antenna array. In contrast, cooperative multi-access systems require each wireless user device to perform antenna selection independently from other wireless user devices. To illustrate this principle consider the following with reference to FIG. 3; wireless user devices 312, 314 are cooperating to communicate with network access station 340 as a transmit cluster 28. Each wireless user device 312, 314, has two antennas and only one RF chain 303, 308, respectively. In calculating the optimal transmitting antenna array subset for the transmit cluster 28, the network access station must choose one antenna from each device 312, 314, even if for instance, both of the antennas on wireless user device 314 perform better than each antenna on wireless user device 312. Thus, the number of antenna subsets for antenna selection in a cooperative multi-access system is less than that for a point-to-point MIMO system, in which the transmit antenna array possesses the same total number of transmitting antennas as the cooperative multi-access system.

Before a transmitting or receiving antenna array subset may be determined, however, the network access station 340, in one embodiment, first estimates the channel from the transmit cluster 28 to the network access station 340. With knowledge of the wireless user devices 312, 314 and the instantaneous channel characteristics, network access station may use a minimum Euclidean distance metric to determine the optimal transmitting antenna array subset for each device, namely wireless user devices 312, 314, and the network access station 340. The network access station may then transmit this information to each of the wireless user devices 312, 314 within the transmit cluster 28. In another embodiment, the network access station may transmit only the channel characteristics and allow the wireless user devices 312, 314 to determine an antenna array subset independently. In still other embodiments, the transmission is over a low bandwidth feedback link, and therefore, does not generate a bandwidth penalty within the primary communication network.

Once the transmitting and receiving antenna array subsets have been determined and transmitted to the transmit cluster 28, the individual wireless user devices 312, 314 may receive the transmission at receive block 301 and 306, respectively. Receive blocks 301, 306 may also be used to receive the bit streams from other wireless user devices within a common transmit cluster 28. In at least one embodiment, the receive block 301, 306 is operative in a different frequency band from the transmitting antenna array. The received bit streams are then sent to a signal generation blocks 302, 307 to generate a modulated signal for propagation into the MIMO channel. In various embodiments the modulated signal is modulated according to a modulation scheme which may be one of cooperative diversity, cooperative multiplexing, a hybrid cooperative mode or a non-cooperative multi-access mode. Once the signal is generated, which will be discussed in more detail below, the signal is passed to the RF chain and ultimately transmitted into the MIMO channel via the determined transmitting antenna array subset. Switches 304 and 309 act to couple the determined transmitting antenna array subset to the available RF chains.

The network access station, having previously determined a receiving antenna array subset, may, in one embodiment, use switch 322 to couple the receiving antenna array subset to the available RF chains for receiving the transmitted communications from the transmit cluster 28. Network access station 340 may then use receive block 330 to demodulate and decode the data from the transmit cluster 28 and separate out the data associated with each of the cooperating wireless user devices 312, 314.

Figure 4:
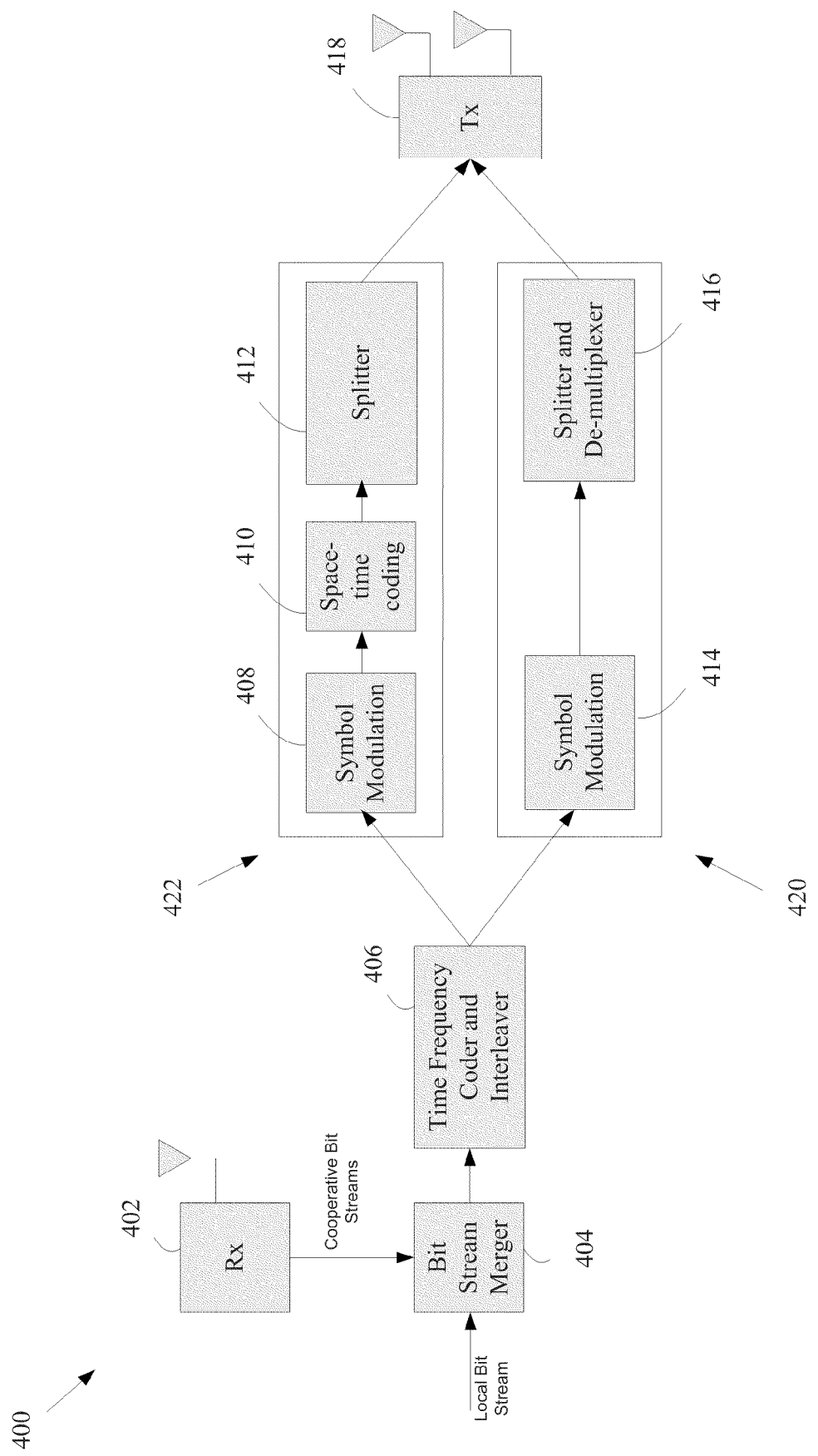
FIG. 4 is a block diagram illustrating an example cooperative multiple access wireless apparatus capable of performing link adaptation in accordance with various embodiments of the present invention.

Referring to FIG. 4, a block diagram illustrating an example cooperative multiple access wireless apparatus capable of performing link adaptation, in accordance with various embodiments of the present invention, is shown. The apparatus 400 includes: a receive block 402, a bit stream merger 404, a time frequency-coder/interleaver 406, first and second encoding paths 422, 420, and a transmitter 418. The transmitter, as shown, includes two antennas, but any number of antennas may be used. In one embodiment, the first and second encoding paths each work to modulate a signal according to a different modulation scheme. The first encoding path may include: a symbol modulator 408, a space-time coding block 410, and a splitter 412. The second encoding path may include: a symbol modulator 414, and a splitter and demultiplexer 416.

In at least one embodiment of the present invention, before data is transmitted to a network access station by the transmit cluster, the devices of the cluster exchange data messages, through a receiver 402, that they wish to transmit to the network access station. The receiver 402 may be operative in a different frequency band than that of the transmitter. Additionally, the wireless apparatus may also receive transmission instructions including a modulation scheme to be used, a transmitting antenna array subset to be used, and/or channel characteristics of the MIMO channel, through receiver 402. After this data exchange, each of the devices of the cluster have the messages of the other devices in the cluster and the transmission instructions from the network access station. The bit stream merger 404, within a particular device, merges the bit streams of the other device(s) within the transmit cluster with the bit stream of the device itself to form a merged bit stream. Each of the other devices within the cooperative cluster also merge the bit streams together in the same fashion. A priority scheme may be established so that each device knows the order with which to merge the bit streams. The merged bit stream is next processed by the time-frequency coder and interleaver 406, which applies time-frequency coding and interleaving to the stream to generate a coded bit stream. Although illustrated as a single unit, it should be appreciated that, in at least one embodiment, the time-frequency coding and interleaving may be performed separately. Each device within the cooperative cluster will apply the identical time-frequency code at this stage.

The coded bit stream is then passed to one of two encoding paths 422 or 420 to modulate the symbol according to a modulation scheme. In an embodiment as shown in FIG. 4, the first encoding path 422 is one of cooperative diversity, and the second encoding path 420 is one of cooperative multiplexing. If, for instance, cooperative diversity is determined to be the more efficient modulation scheme, the coded bit stream is provided to the first encoding path 422, and is first modulated into symbols by symbol modulator 408. The symbols are then space time encoded using the space-time encoder 410 to extract diversity and coding gains. A splitter 412 then takes the space-time encoded symbols and splits them in a predetermined way such that each user within the transmit cluster transmits its portion of the coded symbols. In another embodiment, space-time block coding may be used, in which case each user may perform its space-time block coding operation on the input symbols independently, and thus the splitting operation is not necessary.

If, however, the cooperative multiplexing is determined to be the more efficient modulation scheme, the coded bit stream is modulated into symbols by symbol modulator 414. The symbols are then split by splitter 416 in a predetermined way such that each user transmits its portion of the coded sequence. Each user then demultiplexes, by demultiplexer 416, its share of the coded and modulated symbols in to a number of substreams, and each substream is transmitted on a different transmit antenna.

In another embodiment, the determination of which encoding scheme to utilize is made by a network access station having knowledge of the instantaneous channel state from the network access system to the transmit cluster in which the device 400 is a member. The network access station, in determining which scheme is optimal, fixes the rate of transmission for both diversity coding and spatial multiplexing modes, and chooses the mode that yields the lowest error probability. In at least one embodiment, a minimum Euclidean distance metric may be used. The spatial mode which maximizes the minimum Euclidean distance also minimizes the error probability for a fixed target data rate.

In at least one embodiment of the present invention, the bit stream merging and the time frequency coding and interleaving discussed above are performed within a single device in the cluster. The resulting coded bit stream is then transmitted (e.g., broadcast, etc.) to all of the devices within the cluster. The individual devices in the cluster may then perform their corresponding splitting and transmit operations as discussed previously. In one implementation, additional coding is used to protect the coded stream over the intra-cluster link(s) so that each device receives the correct version of the coded bits.

Figure 5:
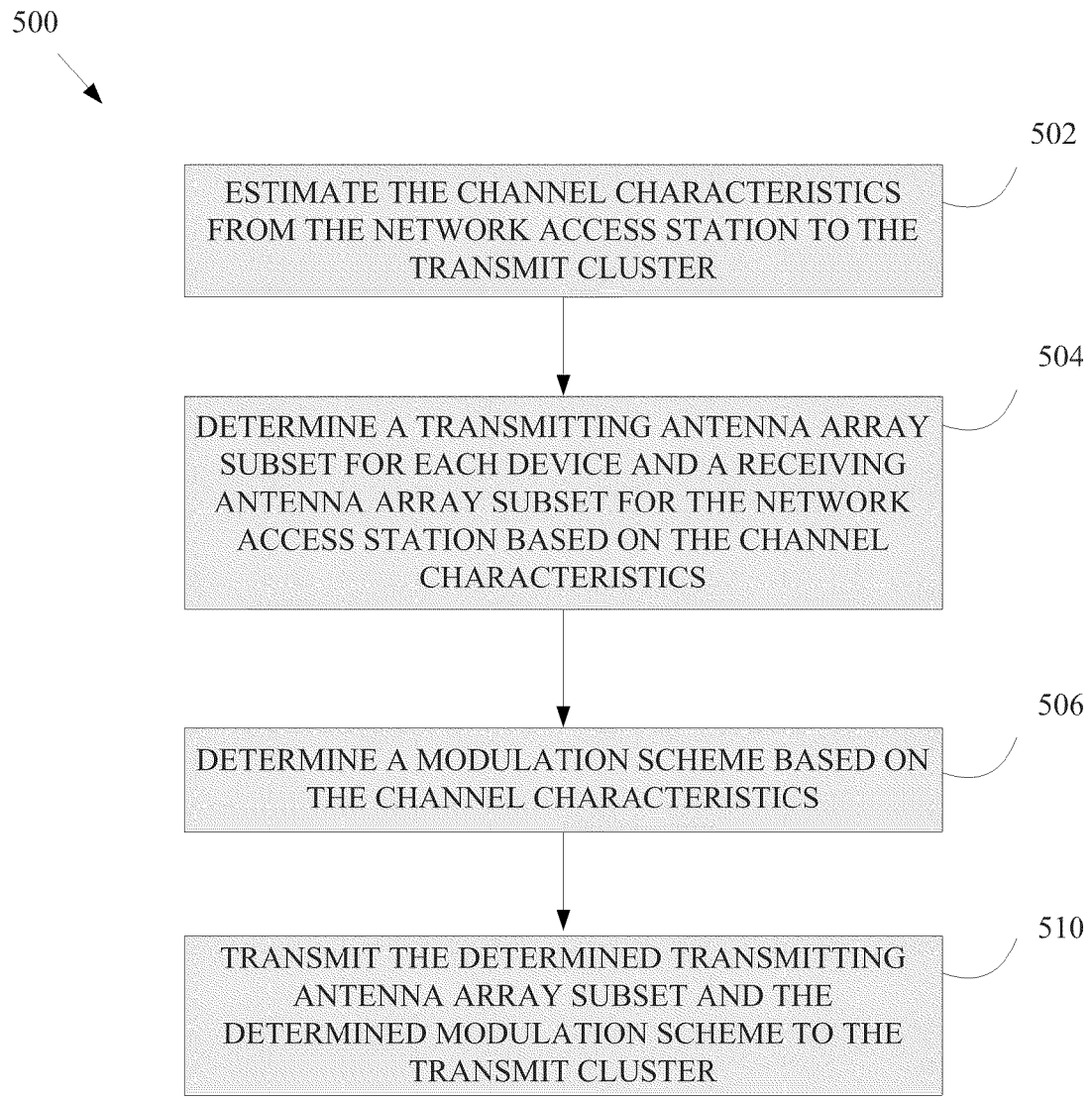
FIG. 5 is a flow chart illustrating an example method of performing link adaptation and antenna selection in a cooperative multiple access wireless network in accordance with various embodiments of the present invention.

FIG. 5 is a flowchart illustrating an example method 500 for performing link adaptation and antenna selection in a cooperative multiple access system, in accordance with an embodiment of the present invention. First, a network access station estimates the channel characteristics from the network access station to the transmit cluster (block 502). Any number of devices (i.e. 2 or more) may be a part of the cluster. The network access station then determines a transmitting antenna array subset for each device and a receiving antenna array subset for the network access station based on the channel characteristics (block 504). The transmitting antenna array and antenna array subset may contain any number of antennas (i.e. 1 or more antennas per device). The number of antennas in the transmitting antenna array subset will be determined by the number of available RF chains in each device. The receiving antenna array and antenna array subset may contain any number of antennas (i.e. 1 or more). The number of antennas in the receiving antenna array subset will be determined by the number of available RF chains at the receiving device. In at least one embodiment the transmitting and receiving antenna arrays (i.e. optimal subset of transmitting and receiving antennas) will be determined by the use of a minimum euclidean distance metric. The network access station then determines a modulation scheme based on the channel characteristics (block 506). The modulation scheme may be one of space-time cooperative diversity, space-time cooperative multiplexing, a hybrid space-time cooperative mode, or a space-time non-cooperative multi-access mode. In one embodiment, the network access station may determine the modulation scheme based upon the use of a minimum euclidean distance metric. In another embodiment, the antenna selection operation in block 504 and link adaptation operation in block 506 can be performed jointly at the same time based on the channel characteristics by the use of a minimum euclidean distance metric. Thereafter, the network access station transmits the determined transmitting antenna array subset and the determined modulation scheme to the transmit cluster (block 510). In one embodiment the transmitting may take place over a low bandwidth feedback link. In other embodiments the transmission may be received by a receive block which is operative in a different frequency band than the transmitting antenna array of the instant device.

Figure 6:
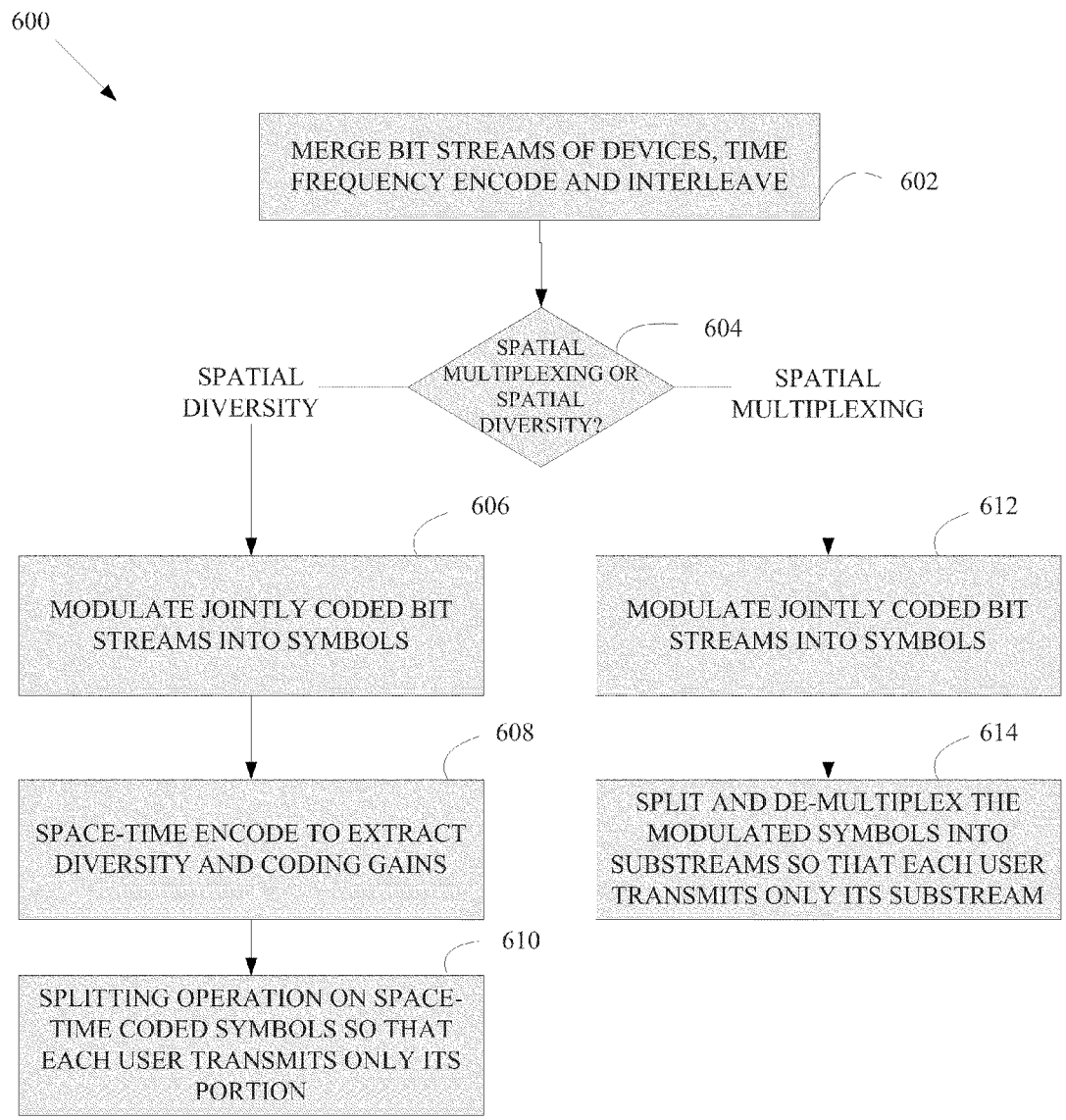
FIG. 6 is a flow chart illustrating a method of performing link adaptation within a wireless device functioning in a cooperative multiple access wireless network in accordance with various embodiments of the present invention.

FIG. 6 is a flowchart illustrating an example method 600 of performing link adaptation within a wireless device functioning in a cooperative multiple access wireless network, in accordance with various embodiments of the present invention. First, a wireless device receives bit streams from other devices within a transmit cluster, merges the bits streams, and time-frequency codes and interleaves the bit streams to form a coded bit stream (block 602). In various embodiments the cluster may contain any number of devices, and consequently, any number of bit streams may be merged. At decision block 604, a decision is made regarding which modulation scheme is to be used to modulate the coded bit stream, spatial multiplexing or spatial diversity. In one embodiment, this decision is made by a network access station based on characteristics of the channel from the network access station to the transmit cluster. In another embodiment, the wireless device may decide which modulation scheme to use. In still other embodiments, various other metrics known in art may be used to decide an optimal modulation scheme. Assuming spatial diversity is chosen, the jointly coded bit streams are modulated into symbols (block 606). Next, the modulated symbols are space-time encoded to extract diversity and coding gains (block 608). Finally, a splitting operating on the space-time encoded symbols is made in a predetermined way such that each user transmits only its portion of the modulated signal (block 610). If at block 604 it is decided that spatial multiplexing is the optimal modulation scheme, the jointly coded bit streams are first modulated into symbols (block 612). At block 614, a splitting operation is performed on the modulated symbols which are then demultiplexed into substreams so that each users transmits only its portion of the coded bit stream.

The techniques and structures for practicing embodiments of the present invention may be implemented in any of a variety of different forms. For example, various features may be embodied within laptop, palmtop, desktop, and tablet computers having wireless capability; personal digital assistants (PDAs) having wireless capability; cellular telephones and other handheld wireless communicators; pagers; satellite communicators; cameras having wireless capability; audio/video devices having wireless capability; network interface cards (NICs) and other network interface structures; base stations; wireless access points; integrated circuits; as instructions and/or data structures stored on machine readable media; and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium. As used herein, the term "logic" may include, by way of example, software or hardware and/or combinations of software and hardware.

It should be appreciated that the individual blocks illustrated in the block diagrams herein may be functional in nature and do not necessarily correspond to discrete hardware elements. For example, in at least one embodiment, two or more of the blocks in a diagram are implemented in software within a single digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed embodiments of the invention require more features than are expressly recited in each claim. Rather, as the following claims reflect, inventive aspects may lie in less than all features of each disclosed embodiment.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   estimating, by a network access station, channel characteristics of a channel between the network access station and a transmit cluster, the network access station having a receiving antenna array of a plurality of antennas, and the transmit cluster comprising at least two wireless devices that cooperatively operate as a single multiple-input, multiple output (MIMO) entity, wherein individual wireless devices include a transmitting antenna array of at least one antenna;
   determining, by the network access station, transmitting antenna array subsets of the transmitting antenna arrays for the individual wireless devices within the transmit cluster based on the channel characteristics;
   determining, by the network access station, a modulation scheme for communication via the channel based on the channel characteristics;
   transmitting, by the network access station, the determined transmitting antenna array subsets and the determined modulation scheme to the wireless devices to facilitate communication between the transmit cluster and the network access station; and
   receiving, from a first wireless device of the at least two wireless devices, a transmission based on the determined transmitting antenna array subsets and the determined modulation scheme, the transmission to include information originating from a second wireless device of the at least two wireless devices.

2. The method of claim 1 further comprising:
   determining, by the network access station, a receiving antenna array subset of the receiving antenna array for the network access station based on the channel characteristics.

3. The method of claim 2, wherein the determining of the transmitting antenna array subset and the receiving antenna array subset is based on a minimum Euclidean distance metric.

4. The method of claim 1, wherein the transmitting is via a feedback downlink having a bandwidth that is less than a bandwidth of a communication uplink between the transmit cluster and the network access station.

5. The method of claim 1, wherein the modulation scheme for communication via the channel comprises one of space-time cooperative diversity, space-time cooperative multiplexing, a hybrid space-time cooperative mode, or a space-time non-cooperative multi-access mode.

6. An apparatus comprising:
   a receive block to receive transmission instructions, which include a modulation scheme and an antenna array subset, from a network access station and a bit stream from a first wireless device in a transmit cluster that includes the apparatus and the first wireless device;
   a signal generation block coupled to the receive block to generate a multiple input multiple output (MIMO) signal based on at least the transmission instructions and the bit stream;
   at least one radio frequency (RF) chain coupled to the signal generation block to facilitate transmission of the MIMO signal into a MIMO channel;

an antenna array comprising at least one antenna coupled to the signal generation block to transmit the MIMO signal into the MIMO channel; and a switch coupled to the at least one RF chain and the antenna array to facilitate a connection between the at least one RF chain and the at least one antenna according to the transmission instructions.

7. The apparatus of claim 6, wherein the modulation scheme is one of space-time cooperative diversity, space-time cooperative multiplexing, a space-time hybrid of cooperative diversity and cooperative multiplexing, or a non-cooperative multi-access scheme.

8. The apparatus of claim 6, wherein the number of RF chains is less than or equal to the number of antennas in the antenna array.

9. The apparatus of claim 6, wherein the transmission instructions are received over a feedback downlink that has a bandwidth that is less than a bandwidth of a communication uplink.

10. The apparatus of claim 6, wherein the receive block is operative in a different frequency band from the antenna array.

11. The apparatus of claim 6, wherein the transmission instructions were generated based on a minimum Euclidean distance metric.

12. The apparatus of claim 6, wherein the transmission instructions include an indication of channel characteristics and the apparatus is configured to determine an array subset to be used in transmitting the MIMO signal based on the received indication of the channel characteristics.

13. A method comprising:

receiving, by a first wireless device from a network access station, transmission instructions for communications between a transmit cluster and the network access station via a communication channel, the transmitting instructions to include a modulation scheme and a transmitting antenna array subset;

receiving, by the first wireless device from a second wireless device, a bit stream, wherein the first and second wireless devices are included within the transmit cluster;

generating, by the first wireless device, a coded bit stream based on the bit stream and a local bit stream;

modulating, by the first wireless device, the coded bit stream into symbols based on the transmission instructions;

selecting, by the first wireless device, a selected transmitting antenna array subset based on the transmission instructions; and transmitting, by the first wireless device, at least a portion of the symbols via the selected transmitting antenna array subset.

14. The method of claim 13, wherein the modulation scheme is one of space-time cooperative diversity, space-time cooperative multiplexing, a space-time hybrid of cooperative diversity and cooperative multiplexing, or a non-cooperative multi-access scheme.

15. The method of claim 13, wherein the transmission instructions fun include the indication of the characteristics of the communication channel.

16. The method of claim 13, wherein the selecting of the selected transmitting antenna array is based on a minimum Euclidean distance metric.

17. The method of claim 13, wherein the receiving of the bit stream and the transmitting of at least the portion of the symbols are done through different frequency bands.

* * * * *

UNITED STATES PATENT AND TRADEMARK OFFICE
CERTIFICATE OF CORRECTION

PATENT NO. : 8,774,110 B2
APPLICATION NO. : 13/182347
DATED : July 8, 2014
INVENTOR(S) : Ozguy Oyman Page 1 of 1

It is certified that error appears in the above-identified patent and that said Letters Patent is hereby corrected as shown below:

In the Claims

Column 12, claim 15,
Line 25, "...instructions fun include..." should read --...instructions further include...--.

Signed and Sealed this
Eighth Day of September, 2015

Michelle K. Lee
*Director of the United States Patent and Trademark Office*